Patented Sept. 8, 1936

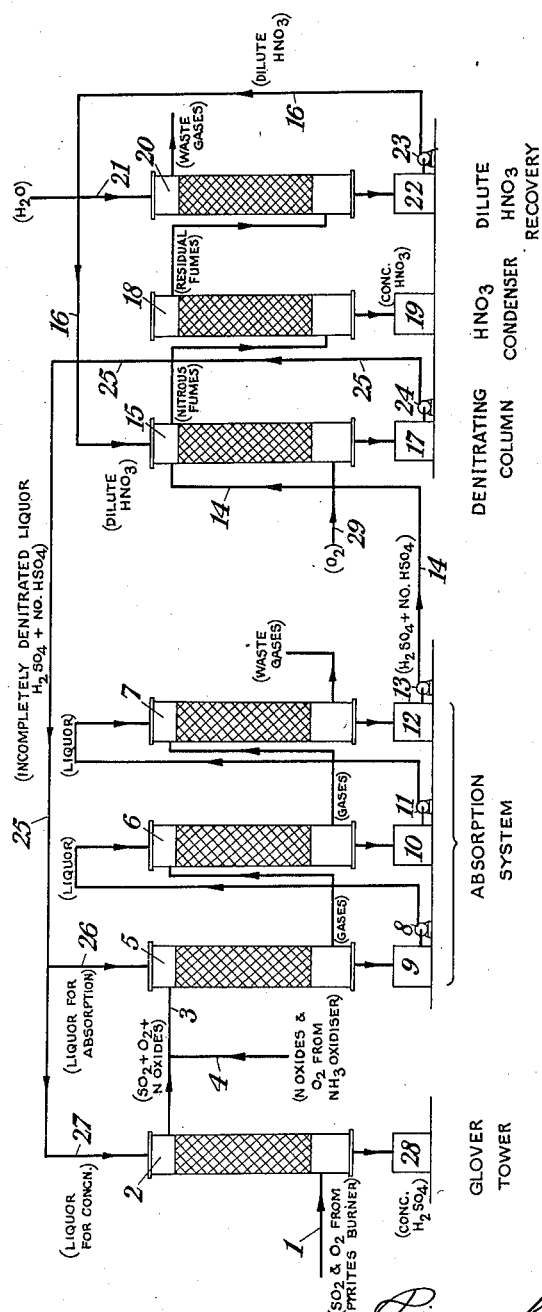

2,053,834

UNITED STATES PATENT OFFICE 2,053,834

PROCESS FOR THE SIMULTANEOUS PRODUCTION OF SULPHURIC AND NITRIC ACIDS

Pierre Kachkaroff, Châtillon-sous-Bagneux, and Camille Matignon, Paris, France

Application November 9, 1932, Serial No. 641,822
In France November 12, 1931

4 Claims. (Cl. 23—168)

In the existing lead chamber and tower processes, sulphuric acid is formed by the oxidation of $SO_2$ to $SO_3$ in presence of oxides of nitrogen. The latter generally operate in a closed cycle, and can, theoretically, oxidize unlimited quantities of $SO_2$.

It is known that the velocity of this reaction greatly increases with increasing concentration of oxides of nitrogen in the cycle, but in the above processes it is necessary to recover the nitrous gases, and this limits the quantity of the oxides of nitrogen which can be introduced. Obviously, this limitation is the main reason for conducting the process at such a high temperature and for the small output of sulphuric acid obtained. Furthermore, owing to the complexity of the reactions leading to the formation of the acid and also to the necessity for recovering the oxides of nitrogen, a much greater concentration of oxygen in the gaseous mixture is required in practice than is indicated by theory. As a result, the efficiency of the process and the output per unit volume of absorption space, are poor even under the most favourable conditions.

On the other hand, synthetic nitric acid is being commercially manufactured by the process of absorbing in water the nitrogen oxides formed either in the electric arc furnace or by the oxidation of ammonia. In this process the nitric acid obtained is the product of complex reactions which proceed by the successive oxidation and absorption and reformation of nitric oxide, NO. This cycle of reactions may be represented by the following chemical equations:

$$2NO + O_2 = 2NO_2 \text{ (Oxidation)}$$

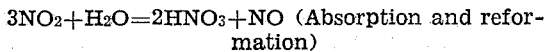

$$3NO_2 + H_2O = 2HNO_3 + NO \text{ (Absorption and reformation)}$$

All these intermediate reactions are generally very slow, particularly at the end of the absorption system, where the concentration of NO is very low. Consequently, the transformation of nitrogen oxides always requires a large and expensive reaction chamber, and furnishes a dilute nitric acid which for concentration, e. g. to the monohydrate, involves a supplementary distillation process and also the use of dehydrating agents, such as sulphuric acid.

It is an object of this invention to increase the efficiency and improve the economy of a process for manufacturing sulphuric acid by the oxidation of sulphur dioxide in the presence of oxides of nitrogen. Another object is to increase the efficiency and improve the economy of the known process for manufacturing nitric acid from oxides of nitrogen, obtained, for example, by the catalytic oxidation of ammonia. Other objects will be apparent hereinafter.

In accordance with the invention, its objects are attained and the drawbacks above-mentioned are eliminated by combining the several isolated processes, i. e. by the formation of sulphuric acid, and preparation and concentration of nitric acid all simultaneously in one and the same plant. In this, the nitrogen oxides to be converted into nitric acid are used to catalyze the oxidation of sulphur dioxide for the production of sulphuric acid. Sulphuric and nitric acids can then be obtained in arbitrarily chosen relative proportions and concentrations. In particular, either acid can be regarded as the primary product and the other as a secondary product.

One of the features of the proposed process is that the oxides of nitrogen which are introduced are withdrawn from the absorption system immediately after the reaction. They do not circulate in the closed cycle, but are continuously recovered in the form of nitric acid. On the other hand, the process steps and the fundamental reaction leading to the generation of sulphuric acid are modified by forming only nitrosyl sulphuric acid or its solution in concentrated sulphuric acid during the absorption of $SO_2$ and nitrogen oxides. By a further operation, the nitrosyl sulphuric acid is then converted into sulphuric and nitric acids which are separately isolated.

Experience shows that the simultaneous absorption of $SO_2$ and nitrogen oxides occurs rapidly and completely within a wide range of temperature (e. g. 15° C. to 100° C.) and such absorption, moreover, requires only a minimum excess of oxygen.

The denitration of the nitrosyl sulphuric acid is effected either by simple dilution of the hot mixture of acids with water vapour and water, or by water vapour and dilute nitric acid obtained (for example) during the recovery of nitrous fumes evolved from nitrosyl sulphuric acid.

The new process will be more readily understood from the following description of the preferred manner of carrying it into practice, reference being had to the accompanying drawings which diagrammatically illustrate the process and main apparatus employed.

Hot sulphurous gases obtained, for example, from a pyrites burner are introduced through the pipe 1 into a Glover tower 2 where they are cooled. The cooled gases leaving the Glover tower 2 pass through the pipe 3 into the first tower or column 5 of the absorption system, consisting of several towers 5, 6, 7, where they are mixed with nitrous vapours obtained, for example, by the catalytic oxidation of ammonia and introduced from the pipe 4 after having been previously cooled.

The absorption system 5, 6, 7 is irrigated by a liquor composed of sulphuric acid more or less charged with nitrosyl sulphuric acid which is circulated through the columns by spraying. The first tower 5 is fed with sulphuric acid which is partially denitrated and relatively dilute which serves for introducing into the absorption system that additional quantity of water necessary for the formation of sulphuric acid and nitrosyl sulphuric acid by reaction with the sulphurous and nitrous gases.

The acid liquor in circulation is gradually and periodically transferred from the first tower 5 to the second tower 6 and from the second tower 6 to the third tower 7. This is achieved by transferring to the top of the tower 6 by means of pump 8 the acid liquor collected in the receiver 9 from the first tower 5. Similarly, the acid liquor collected in the receiver 10 from the tower 6 is transferred to the top of the tower 7 by the pump 11. Both the irrigating acid liquor and the gaseous mixture are passed through each tower in the same direction, as is shown by the direction of the arrows in the drawings.

The constituents of the gaseous mixture, viz. sulphurous acid, nitrous fumes, oxygen, as well as the water of the absorbing liquid, inter-react at once and completely to form sulphuric acid and nitrosyl sulphuric acid in the circulating acid. In this way, the concentration of the circulating acid progressively increases. It may vary between wide limits, e. g. from 65 to 95% of monohydrated sulphuric acid. The reactions are so intensive that thus there is obtained a system which has an immense production capacity, capable of reaching for example one ton of sulphuric acid per cubic metre of reaction space per day.

Given that the absorption of $SO_2$ and nitrogen oxides is carried out so as to form only nitrosyl sulphuric acid or its solution in sulphuric acid and also to progressively increase the concentration of the absorbing liquor in these two acids as the absorption proceeds, it will be apparent to those skilled in the art that, from known facts of the properties of nitrosyl sulphuric acid, the temperature under which the absorption is carried out must be maintained sufficiently low throughout the absorption system to promote the formation and avoid decomposition of the nitrosyl sulphuric acid.

The relative proportions of sulphuric acid and of nitrosyl sulphuric acid so formed can be varied arbitrarily, according to the relative volumes and respective compositions of the two initial gas currents.

The sulphurous gases employed may be obtained by roasting pyrites, zinc blende, copper ores, or from any other suitable source. The nitrous gases used may be obtained by the catalytic oxidation of ammonia, by the oxidation of nitrogen in the electric arc, or from any other suitable source.

The highly concentrated nitrosyl sulphuric acid liquor obtained in the receiver 12 from the last tower 7 of the absorption system is transferred by pump 13 through pipe 14 to the denitration column 15 where it is decomposed by heat and dilution. For this purpose, dilute nitric acid and water vapour are introduced into the column 15 through the pipe 16. The necessary heat is provided by the water vapour and at the same time as the water vapour gives up its heat to the acid liquor, the vapour is condensed to form liquid water which with the water of the dilute nitric acid effects the necessary dilution of the acid liquor. Instead of supplying dilute nitric acid to the column 15, water may be supplied, but, as will be seen from the description as it proceeds, it is preferable to use dilute nitric acid in this process step.

The denitration yields a sulphuric acid liquor which is usually not found to be completely denitrated and this is collected in the receiver 17. At the same time highly concentrated nitrous gases are liberated by the decomposition of the nitrosyl sulphuric acid and these gases contain highly concentrated nitric acid vapour and also nitrous vapours from which dilute nitric acid can be obtained by absorption. If, as is shown, dilute nitric acid is supplied to the column 15 it becomes concentrated, but if water is used, a dilute nitric acid is formed.

The greater part of the dilute nitric acid supplied to the column 15 from the pipe 16 is distilled in the course of the denitration and the remander oxidizes the liberated nitrogen oxides from the nitrosyl sulphuric acid. The decomposition of the nitrosyl sulphuric acid and the distillation of the nitric acid are favoured by the introduction into the denitration column 15, through pipe 29, of a definite quantity of air which does not exceed that necessary for oxidizing to nitric acid the nitrogen oxides liberated by the decomposition.

The incompletely denitrated sulphuric acid liquor collected in the receiver 17 is transferred by the pump 24 along pipe 25 which divides into two branches 26 and 27, the branch 26 leading to the first tower 5 of the absorption system while the other branch 27 leads to the Glover tower 2. The sulphuric acid liquor divides between these two branches, some passing into the tower 5, whilst the remainder passes through the Glover tower 2 where its final denitration and concentration is completed by contact with incoming hot sulphurous gases from pipe 1. The concentrated sulphuric acid is collected in the receiver 28 and the nitrogen oxides released in this final denitration operation are entrained by the sulphurous gas current and pass into the first tower 5 of the absorption system. The heat exchange between the sulphurous gases and the liquor in the Glover tower 2 not only effects the final denitration of the liquor but also cools the gases before they enter the absorption system. For the same purpose, the nitrous gases, which are shown introduced through the pipe 4, may alternatively be sent through the Glover tower 2. However, it is preferred to feed them directly to the absorption system as shown. The concentration of the sulphuric acid collected in the receiver 28 may reach 92% $H_2SO_4$.

As stated above, the nitrous vapours leaving the denitration column 15 contain concentrated nitric acid fumes and concentrated nitrous vapours. These vapours are therefore passed into a condenser 18 where the nitric acid fumes are condensed by cooling and the concentrated nitric acid is collected in the receiver 19. The concentration of the nitric acid condensed in the condenser 18 depends on the total quantity of water introduced into the denitration column 15 and it can therefore be varied within limits sufficiently wide to admit of the monohydrated nitric acid being obtained from the condenser 18.

Here again, the denitration column is an efficiently working apparatus because of the intensity of the reactions due to the high concentration of nitrosyl sulphuric acid in the liquid phase and of nitrogen oxides in the gaseous phase.

Owing to their high concentration and advanced state of oxidation, the residual nitrous fumes which issue from the condenser 18 can be easily and rapidly transformed into dilute nitric acid by absorption with water. For this purpose, they are transferred to an absorption column 20 into which water is introduced from a pipe 21. The liquor collected in the receiver 22 from the column 20 contains dilute nitric acid and can be removed and utilized in that form, but preferably it is returned through pipe 16 by means of a pump 23 to the denitration column 15 where it serves for the dilution and denitration of a further quantity of acid liquor introduced into the denitration column from the absorption system 5, 6, 7. It follows that all the nitric acid can be recovered from the system in a more or less concentrated state, by condensation and absorption after leaving the denitration column.

From the series of reactions above-described is apparent the fact that the greater part of the water required for the formation of the sulphuric acid and the nitrosyl sulphuric acid is introduced into the denitration column 15, that is to say, outside the system 5, 6, 7 where the fundamental absorption reaction takes place.

To reiterate, therefore, the process according to this invention is characterized by the intensive and simultaneous production of sulphuric and nitric acids, which is made possible by the great velocity with which all the generative reactions concerned can be effected. This process consequently enables the expenditure to be greatly reduced on a plant capable of a given output tonnage of the two acids.

We claim:

1. A continuous process for the simultaneous production of sulphuric acid and nitric acid, which comprises passing a pre-cooled gaseous mixture of sulphurous vapours and nitrous vapours, together with a liquor containing a mixture of sulphuric acid and nitrosyl sulphuric acid, in the same direction successively through a plurality of absorption columns constituting an absorption system, while maintaining a temperature throughout said system sufficiently low to promote the formation and avoid decomposition of nitrosyl sulphuric acid, so as thereby to cause a progressive absorption of both said sulphurous vapours and said nitrous vapours by the said acid liquor, and thereby progressively increase the concentration of the said acid liquor as it proceeds through the said system, without decomposition of said liquor in said system; thereafter removing the said concentrated acid liquor from the last column of said system and decomposing said liquor in a separate operation into sulphuric acid and gaseous nitric acid and nitrogen oxides.

2. A continuous process for the simultaneous production of sulphuric acid and nitric acid, which comprises passing a pre-cooled gaseous mixture of sulphurous vapours and nitrous vapours together with a liquor containing a mixture of sulphuric acid and nitrosyl sulphuric acid in the same direction successively through a plurality of absorption columns constituting an absorption system, while maintaining a temperature throughout said system sufficiently low to promote the formation and avoid decomposition of nitrosyl sulphuric acid, so as thereby to cause a progressive absorption of both said sulphurous vapours and said nitrous vapours by said acid liquor, and thereby progressively increase the concentration of said acid liquor as it proceeds through said absorption system, without decomposition in said system; transferring said concentrated acid liquor obtained from the last column of said absorption system to a denitration column and there denitrating said concentrated liquor by reaction with dilute nitric acid, heat and water vapour to form a gaseous denitration product and a liquor residue; condensing concentrated nitric acid from said gaseous product and withdrawing it from the process; converting the residue of said gaseous product into dilute nitric acid and transferring said dilute acid to the said denitration column so as to denitrate further quantities of said concentrated liquor therewith; transferring a part of said liquor residue to said absorption system to absorb further quantities of reactant sulphurous and nitrous vapours introduced thereinto; and concentrating the sulphuric acid in the remainder of said liquor residue by contact with hot sulphurous vapours prior to the entry of the sulphurous vapours into said absorption system.

3. A continuous process for the simultaneous production of sulphuric acid and nitric acid, which comprises passing a pre-cooled gaseous mixture of sulphurous vapours and nitrous vapours, together with a liquor containing a mixture of sulphuric acid and nitrosyl sulphuric acid, in the same direction through a plurality of absorption columns constituting an absorption system, while maintaining a temperature throughout said system sufficiently low to promote the formation and avoid decomposition of nitrosyl sulphuric acid, so as thereby to cause a progressive absorption of both the sulphurous vapours and the nitrous vapours by the said acid liquor, and thereby progressively increase the concentration of the said acid liquor as it proceeds through the said system, without decomposition of said liquor in said system; transferring said concentrated acid liquor from the last column of said absorption system to a denitration column and there partially denitrating the said concentrated acid liquor, by decomposition, into a gaseous product containing nitric acid and nitrogen oxides and a partially denitrated liquor residue; transferring a part of said liquor residue to said absorption system to absorb further quantities of reactant sulphurous and nitrous vapours introduced thereinto; transferring the remainder of said partially denitrated liquor residue to a Glover tower and there treating it by contact with hot sulphurous vapours, prior to their entry into said absorption system, to concentrate and complete the denitration of the sulphuric acid in said remainder.

4. A continuous process for the simultaneous production of sulphuric acid and nitric acid, which comprises converting a pre-cooled gaseous mixture of sulphurous vapours and nitrous vapours by absorption into a liquid mixture of sulphuric acid and nitrosyl sulphuric acid; thereafter, in a separate operation, treating said acid mixture, by decomposing part of the nitrosyl sulphuric acid therein, to form a partially denitrated sulphuric acid liquor and a gaseous product containing nitric acid and nitrogen oxides; and bringing the said partially denitrated liquor in contact with hot sulphurous vapours, prior to their said conversion, to complete the decomposition of the nitrosyl sulphuric acid in said liquor and thereby completely denitrate and finally concentrate the sulphuric acid.

PIERRE KACHKAROFF.
CAMILLE MATIGNON.